United States Patent
Liu et al.

(10) Patent No.: US 8,941,911 B2
(45) Date of Patent: Jan. 27, 2015

(54) METHODS AND DEVICES FOR EFFICIENT OPTICAL FIBER AMPLIFIERS

(71) Applicants: Yunqu Liu, Kanata (CA); Kin-Wai Leong, Ottawa (CA)

(72) Inventors: Yunqu Liu, Kanata (CA); Kin-Wai Leong, Ottawa (CA)

(73) Assignee: Viscore Technologies Inc., Kanata (CA)

( * ) Notice: Subject to any disclaimer, the term of this patent is extended or adjusted under 35 U.S.C. 154(b) by 0 days.

(21) Appl. No.: 14/081,198

(22) Filed: Nov. 15, 2013

(65) Prior Publication Data

US 2014/0139908 A1 May 22, 2014

Related U.S. Application Data

(60) Provisional application No. 61/727,193, filed on Nov. 16, 2012.

(51) Int. Cl.
*H01S 3/091* (2006.01)

(52) U.S. Cl.
USPC .............. 359/337.4; 359/341.32; 359/341.33

(58) Field of Classification Search
USPC .............................. 359/337.4, 341.32, 341.33
See application file for complete search history.

(56) References Cited

U.S. PATENT DOCUMENTS

| 8,390,923 | B2* | 3/2013 | Takeyama | 359/337.4 |
| 2007/0171517 | A1* | 7/2007 | Kinoshita | 359/337.4 |
| 2011/0085230 | A1* | 4/2011 | Rapp et al. | 359/341.3 |
| 2012/0182602 | A1* | 7/2012 | Rapp | 359/341.3 |

* cited by examiner

*Primary Examiner* — Mark Hellner
(74) *Attorney, Agent, or Firm* — The Law Office of Michael E. Kondoudis

(57) ABSTRACT

Doped fiber amplifiers (DFA) using rare-earth doping materials with linear and non-linear interactions between the optical signal to be amplified and the pump laser have become a standard element of optical telecommunications systems for multiple applications including for example extending the reach of optical links before opto-electronic conversion is required or support increased fanout. However, in many applications wherein multiple DFAs are employed the electrical power budget wherein the pump laser diode (LD) represents approximately 25% of the module power consumption directly, and closer to approximately 40-50% once the control and drive electronics for the thermoelectric cooler and LD are included. Accordingly, it would be beneficial to reduce the overall power consumption of a DFA by exploiting unused optical pump power such that multiple gain stages, within the same or different DFAs, may be driven from a single pump LD.

14 Claims, 8 Drawing Sheets

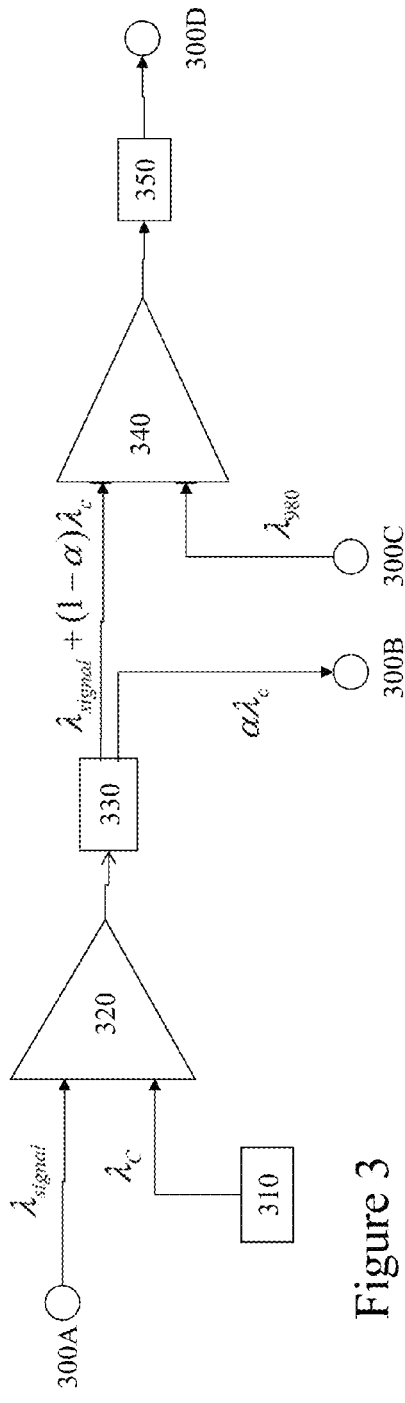
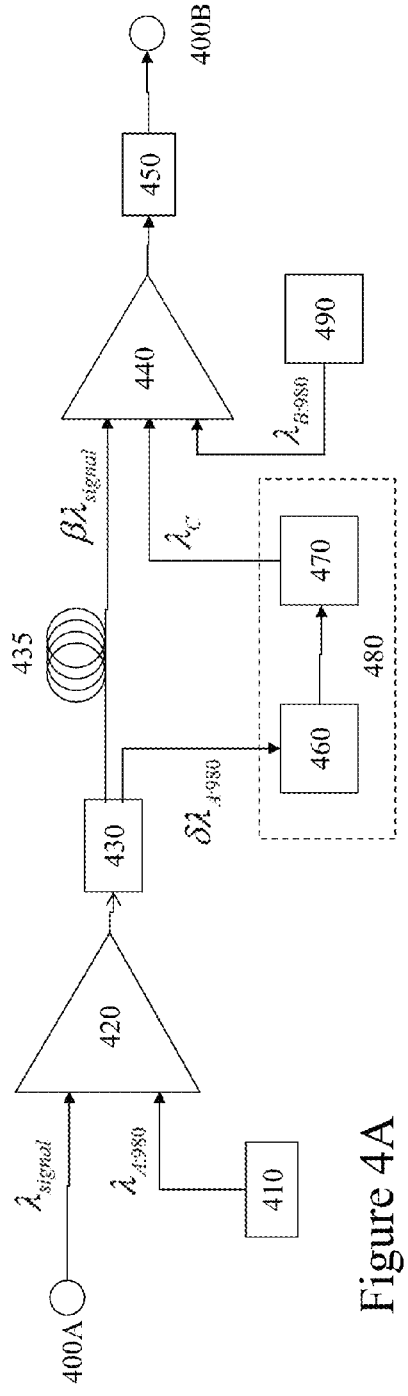
Figure 3
Figure 4A

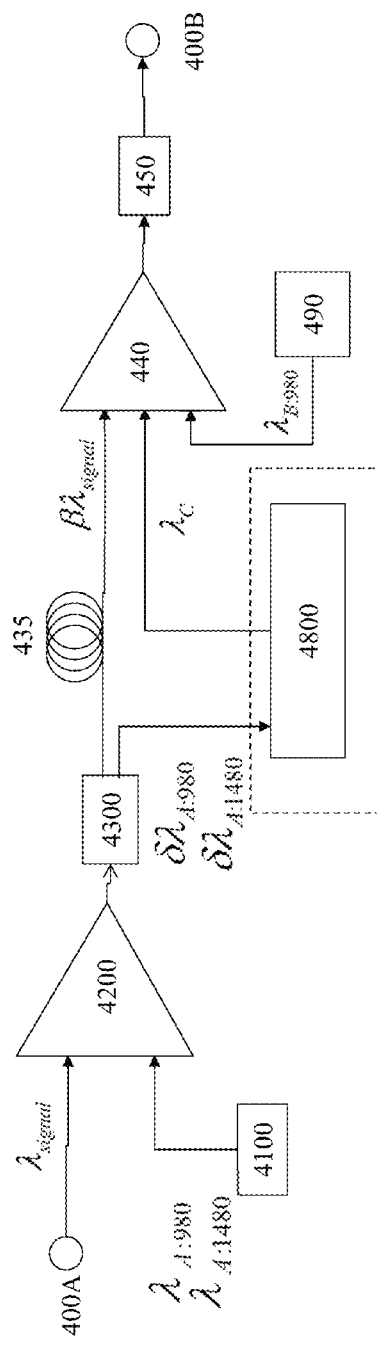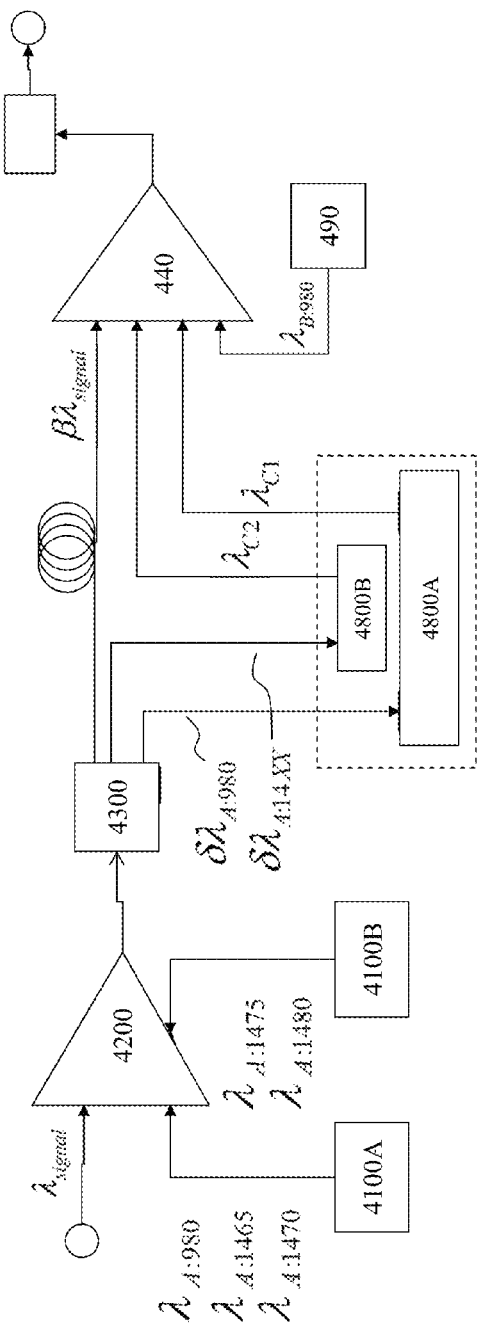
Figure 4B
Figure 4C

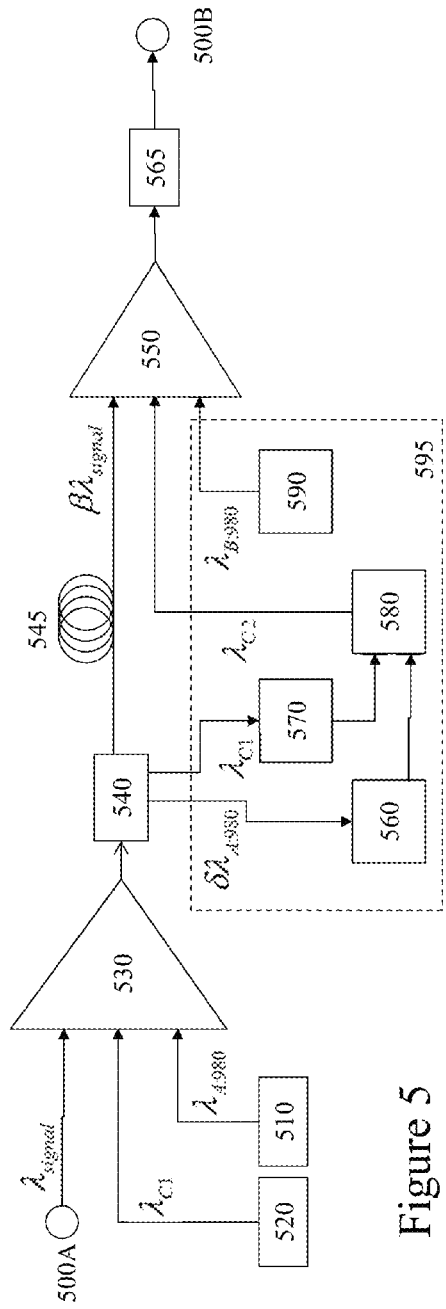
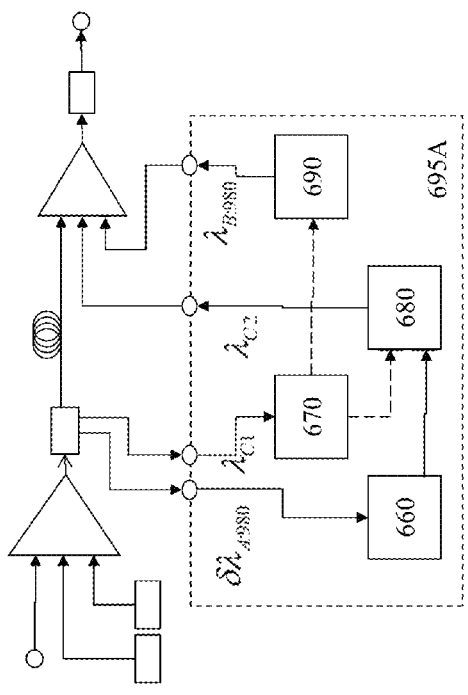
Figure 5
Figure 6A

METHODS AND DEVICES FOR EFFICIENT OPTICAL FIBER AMPLIFIERS

CROSS-REFERENCE TO RELATED APPLICATIONS

This patent application claims the benefit of U.S. Provisional Patent Application 61/727,193 filed Nov. 16, 2012 entitled "Methods and Devices for Efficient Optical Fiber Amplifiers", the entire contents of this patent application being included by reference.

FIELD OF THE INVENTION

The present invention relates to optical fiber amplifiers and more particularly to methods and architectures for efficient optical fiber amplifiers.

BACKGROUND OF THE INVENTION

Optical fiber communications is seen as one of the most reliable telecommunication technologies to achieve consumers' needs for present and future applications. It is reliable in handling and transmitting data through hundreds of kilometers with an acceptable bit error rate and today, optical fiber communication dominate as the physical medium for medium and long distance data transmission systems and telecommunications networks. At the same time optical fiber solutions appear in short-haul applications, local area networks, fiber-to-the-home/curb/cabinet, and digital cable systems. Fundamentally, optical transmission systems are based on the principle that light can carry more information over longer distances in a glass medium than electrical signals can carry information over copper or coaxial cable.

Light is electromagnetic waves and optical fiber is a waveguide, and whilst very low loss in certain wavelength ranges, e.g. $\alpha < 0.22$ dB/km for Corning SMF-28 single mode silica fiber, ultimately in order to compensate the loss of the waveguide, an optical amplifier is needed. Doped fiber amplifiers (DFA) are optical amplifiers which uses rare-earth doping materials including, Erbium ($Er^{3+}$), Praseodymium ($Pr^{3+}$), Europium ($Eu^{3+}$), Neodymium ($Nd^{3+}$), Terbium ($Te^{3+}$), Lutetium ($Lu^{3+}$), Ytterbium ($Yb^{3+}$), Holmium ($Ho^{3+}$), Dysprosium ($Dy^{3+}$), Gadolinium ($Gd^{3+}$), Samarium ($Sm^{3+}$), Promethium ($Pm^{3+}$), Cerium ($Ce^{3+}$), Lanthanum ($La^{3+}$) and Thulium ($Tm^{3+}$) inside the optical fiber. Essentially, within a transmission line the DFA is connected to a pump laser and works on principle of stimulated emission wherein the pump laser is used to provide energy and excite ions to an upper energy level. These excited ions are then stimulated by photons of the information signal and brought down to lower levels of energy such that they emit photon energy exactly on the same wavelength of the input signal. In addition to optical amplification for medium and long haul telecommunications, particularly within optical fiber communication systems (OFCS), DFAs are also employed, for example, as non-linear optical devices and optical switches.

In OFCS, the active medium of DFAs operating in the 1550 nm window is Erbium ($Er^{3+}$) and significant research in the past 25 years has been addressed to their performance, optimization, and manufacturing resulting in thousands of publications on Erbium Doped Fiber Amplifiers (EDFAs) alone together with thousands of others to their use within systems and other optical elements of OFCS. Erbium doped silica based fibers which form the active medium within the EDFA are favoured as the emission of $Er^{3+}$ ions is within a set of wavelength around 1550 nm where the silica fiber also exhibits the minimum attenuation on the information signal in its transmission via silica based fibers, such as Corning SMF-28 for example. EDFAs can gains as high as 40 dB, equivalent to 80 km of silica based singlemode fiber, with low noise. Important features of EDFAs include the ability to pump the devices at several different wavelengths, low coupling loss to the compatible fiber transmission medium and very low dependence of gain on light polarization due to the cylindrical shape of Erbium doped fiber. In addition, EDFAs are highly transparent to signal format and bit rate, since they exhibit slow gain dynamics, with carrier lifetimes of 0.1 to 10 ms, which result in the gain response of EDFAs being basically constant for signal modulations greater than a few kilohertz to tens of gigahertz. Consequently, they are immune from interference effects, such as crosstalk and inter-modulation distortion between different optical channels within a broad spectrum of wavelengths, typically a 30 nm spectral band referred to as the C-band ranging from 1530 to 1560 nm, that are injected simultaneously into the EDFA.

Subsequently, L-band EDFAs with flat optical gain from 1574 nm to 1604 nm and S-band EDFAs with gain from 1490 nm to 1520 nm, were established allowing dense wavelength division multiplexing (DWDM) at up to 160 channels, each operating at 10 Gb/s and with 50 GHz channel spacing. Whilst, there have been thousands of papers in the literature for optimizing gain, noise figure, gain flatness, etc as well as the design and integration of inter-stage elements such as dispersion compensation fibers (DCF) or gain equalization filters (GEF), are commonly located within the stages in order to solve the tradeoff between noise figure degradation, output power decrease, and inter symbol interference.

However, whilst research activities were focused to reducing noise figure and higher output powers, such as were achieved through combinations of increasing pump laser output power and multiple pump sources, one significant design parameter of the EDFA and in general DFAs received little emphasis and focus, this being the efficiency of the DFA in terms of the pump power converted into the output channel signal(s). This pump power conversion efficiency (PCE) became a focus when combined C+L band EDFAs were being developed as researchers exploited a variety of single, dual, multi-pump designs with single, double, triple and quadruple pass configurations such as discussed by Naji et al in "Review of Erbium-doped Fiber Amplifier" (Int. J. Phys. Sci., Vol. 6, pp. 4674-4689). However, here the primary focus was again increasing the L-band output power through these configurations as well as shifting the pumping wavelength from 980 nm or 1480 nm into the C-band, such as 1545 nm for example. In fact nearly twenty years after the first EDFA demonstrations fundamental analysis of PCE within erbium doped fiber (EDF) configurations began to define operating regimes and present alternatives to the prevalent use in high power applications of large mode area fiber with low numerical aperture (NA) to lower pump power intensity. Whilst this prevalent design approach reduces the nonlinear effects such as 980 nm pump excited state absorption it limits the power conversion efficiency at high power to approximately 30%.

This analysis, such as by Wang et al entitled "Novel Erbium Doped Fiber for High Power Applications" (Proc. SPIE Passive Components and Fiber-Based Devices 2005) showed that whilst PCE varies with pump power for constant NA and peak PCE occurs at different pump powers for different NA fibers it still only reaches 50-53%. Discrete PCE results have been reported above these values using titanium-sapphire lasers, such as Mahdi et al in "Single-Mode Pumping Scheme for EDFA with High-Power Conversion Efficiency using a 980 nm Ti:S Laser" (Microwave and Optical Technology Letters, Vol. 48, pp 71-74), where the PCE reached 60%, representing a quantum efficiency of 95%, these have been achieved using large research lasers and laboratory optical arrangements rather than the technician assembled semiconductor laser pumped configurations suitable for widespread deployment in telecommunications. Accordingly, the dominant commercial EDFA designs using large mode area fibers, production optical sub-assemblies, and commercial semiconductor laser diode pump sources operate at only approximately 30% power conversion efficiency from their pump signal, typically 980 nm, to the optical signals being amplified.

A high power EDFA operating at +23 dBm (200 mW) maximum output power requires approximately 600 mW of 980 nm pump power when operating at 30% efficiency. Within an EDFA module, such as for example a JDS Uniphase® WaveReady™ WRA-217 blade module, wherein the typical power consumption of the overall pump, coolers, control electronics etc is 18 W typically and 24 W maximum this "wasted" 400 mW of 980 nm optical power may not seem that significant. However, the power consumption of the 980 nm pump laser itself is approximately 2 W and the thermo-electric cooler (TEC) required to maintain the semiconductor laser diode operating temperature under varying ambient conditions typically consumes approximately between 2 W and 3 W at high ambient temperatures such as common within equipment cases and racks. The remaining power consumption is associated with network interfaces, power supplies etc which are only required where there are active electronic or electro-optical elements.

Accordingly, the 980 nm pump laser diode (LD) represents approximately 25% of the module power consumption directly, which is actually closer to approximately 40-50% once the control and drive electronics for the TEC and LD respectively are included within the calculation. It would therefore be beneficial to reduce the overall power consumption of a DFA by exploiting the unused optical pump power such that a lower power LD may be exploited thereby similarly reducing the requirements for TEC, TEC drive circuit, and LD drive circuit.

Accordingly, where multiple DFAs are to be employed in conjunction with one another such as for example at optical switches, optical cross-connects, and multi-channel reconfigurable optical add-drop multiplexers then every channel will exploit a similar DFA consuming, in the case of the WaveReady™ WRA-217, approximately 18 W. Accordingly, an 12×12 optical cross-connect, representing a cross-connect for example at the intersection of two links each comprising 6 optical fibers, 3 East and 3 West within a first ring and 3 North and 3 South in the second ring, with a DFA per channel therefore would consume 12×18 W=216 W of power. However, if the remaining optical pump power of the DFA can be re-used within another DFA then there is an opportunity to significantly reduce the power consumption of the DFAs associated with the optical cross-connect. For example, using the example above of DFAs consuming 200 mW maximum 980 nm pump power with a 600 mW 980 nm LD then potentially only a single LD may be employed to provide the optical pump power required across 3 DFAs. Accordingly, rather than the prior 12 DFAs with 12 pump LDs it would be beneficial to reuse the unused optical pump power such that 12 DFAs with only 4 pump LDs were required. Accordingly the DFAs would now consume only 4×18 W=72 W, representing a saving of 144 W.

It would be further evident, from the prior art analysis and experiments such as taught by Wang that the PCE of an optical amplifier varies with optical pump power such that for example a NA=0.14 EDF varies from a PCE of below 0.4 to above 0.52 as the pump power varies from about 50 mW to 300 mW. Accordingly, it would be beneficial to maintain a DFA within a predetermined operating regime for increased performance overall of the amplifier node from a power consumption viewpoint. It would also be evident that where multiple amplifiers are utilizing the same pump laser within a serial coupling of the pump to the multiple amplifiers rather than a parallel configuration that the power supplied sequentially between each pair of DFAs should be within a predetermined range in order to ensure that each amplifier operates as intended.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art in respect of optical fiber amplifiers and more particularly to methods and architectures for efficient optical fiber amplifiers.

In accordance with an embodiment of the invention there is provided a method comprising:
providing a first optical amplifier comprising:
    a first optical gain block for receiving optical signals to be amplified within a first predetermined wavelength range;
    an first optical pump signal coupled to the first optical gain block for establishing a population inversion within the first optical gain block to provide gain to optical signals within a second predetermined wavelength range; and
    a first optical control signal coupled to the first optical gain block, the first control signal being within a third predetermined wavelength range;
providing a wavelength selective coupler disposed after the first optical gain block for separating the amplified optical signals from the first gain block from the residual optical pump signal;
providing a second optical amplifier comprising:
    a second optical gain block for receiving the amplified optical signals from the first optical gain block;
    a second optical pump signal for establishing a population inversion within the second optical gain block to provide additional gain to optical signals within a third predetermined wavelength range; and
    a second optical control signal coupled to the second optical gain block, the second control signal being within a fourth predetermined wavelength range; and
    generating using residual first optical pump signal from the first optical amplifier at least one of the second optical control signal and second optical pump signal.

In accordance with an embodiment of the invention there is provided a method comprising:
providing a first optical amplifier comprising:
    a first optical gain block for receiving optical signals to be amplified within a first predetermined wavelength range;
    an first optical pump signal coupled to the first optical gain block for establishing a population inversion within the first optical gain block to provide gain to optical signals within a second predetermined wavelength range; and providing a wavelength selective coupler disposed after the first optical gain block for separating the amplified optical signals from the first gain block from the residual optical pump signal;

providing a second optical amplifier comprising:
  a second optical gain block for receiving the amplified optical signals from the first optical gain block;
  a second optical pump signal for establishing a population inversion within the second optical gain block to provide additional gain to optical signals within a third predetermined wavelength range; and
  generating using residual first optical pump signal from the first optical amplifier at least one of the second optical control signal and second optical pump signal.

In accordance with another embodiment of the invention there is provided a method comprising:

providing a first optical amplifier comprising:
  a first optical gain block for receiving first optical signals from a first optical fiber to be amplified within a first predetermined wavelength range;
  an first optical pump signal within a second predetermined wavelength range coupled to the first optical gain block for establishing a population inversion within the first optical gain block to provide gain to the first optical signals; and
providing a wavelength selective coupler for separating the amplified first optical signals from the first optical amplifier from residual optical pump signal not absorbed by the first optical gain block;

providing a second optical amplifier comprising:
  a second optical gain block for receiving the second optical signals from a second optical fiber to be amplified within a second predetermined wavelength range;
  using residual first optical pump signal from the first optical amplifier to provide a second optical pump signal for establishing a population inversion within the second optical gain block to provide gain to the second optical signals within the third predetermined wavelength range.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 depicts an optical amplifier according to an embodiment of the invention employing dual pump sources and in-band channel power management;

FIG. 4A depicts an optical amplifier according to an embodiment of the invention employing feed-forward optoelectronic and optoelectronic conversions;

FIGS. 4B and 4C depict optical amplifiers according to embodiments of the invention employing feed-forward optoelectronic and optoelectronic conversions;

FIG. 5 depicts an optical amplifier according to an embodiment of the invention employing feed-forward optoelectronic and optoelectronic conversions in conjunction with dynamic in-band channel power management;

FIG. 6A through 6C depicts controller variants for optical amplifiers according to embodiments of the invention for an optical amplifier such as depicted in FIG. 5 employing feed-forward optoelectronic and optoelectronic conversions in conjunction with dynamic in-band channel power management;

DETAILED DESCRIPTION

The present invention is directed to optical fiber amplifiers and more particularly to methods and architectures for efficient optical fiber amplifiers.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Figure 1:
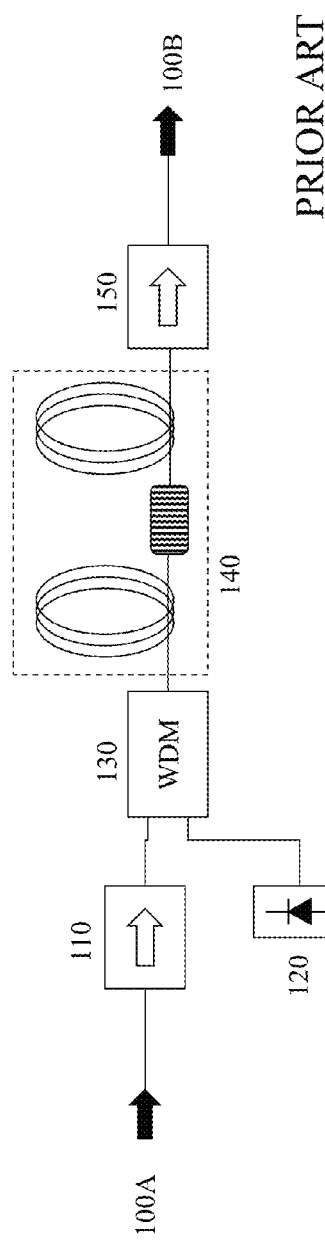
FIG. 1 depicts a single stage DFA according to the prior art.

Referring to FIG. 1 there is depicted a single stage DFA according to the prior art disposed between an input port 100A and an output port 100B. The optical signal or signals received are coupled to an input isolator 110 before being combined in WDM 130 with the pump laser signal from pump LD 120. The combined pump laser signal and optical signals are then coupled to optical fiber block 140 wherein the pump laser signal generates the required inversion within the dopants of the optical fiber thereby amplifying the optical signals as is well known within the prior art. The output from the optical fiber block 140 is then coupled to output isolator 150 thereby isolating the single stage DFA from any reflections downstream. Accordingly, in operation the optical output power of the pump LD 120 is dynamically adjusted in response to the requirements of the optical amplifier in terms of optical output power per channel. A control loop, not shown for clarity, may interact with the controller, not shown for clarity, for the pump LD 120 to adjust the optical output power based upon either a determination made local to the optical amplifier (such as number of channels, power, etc) or information conveyed to the optical amplifier from a network management system.

Figure 2:
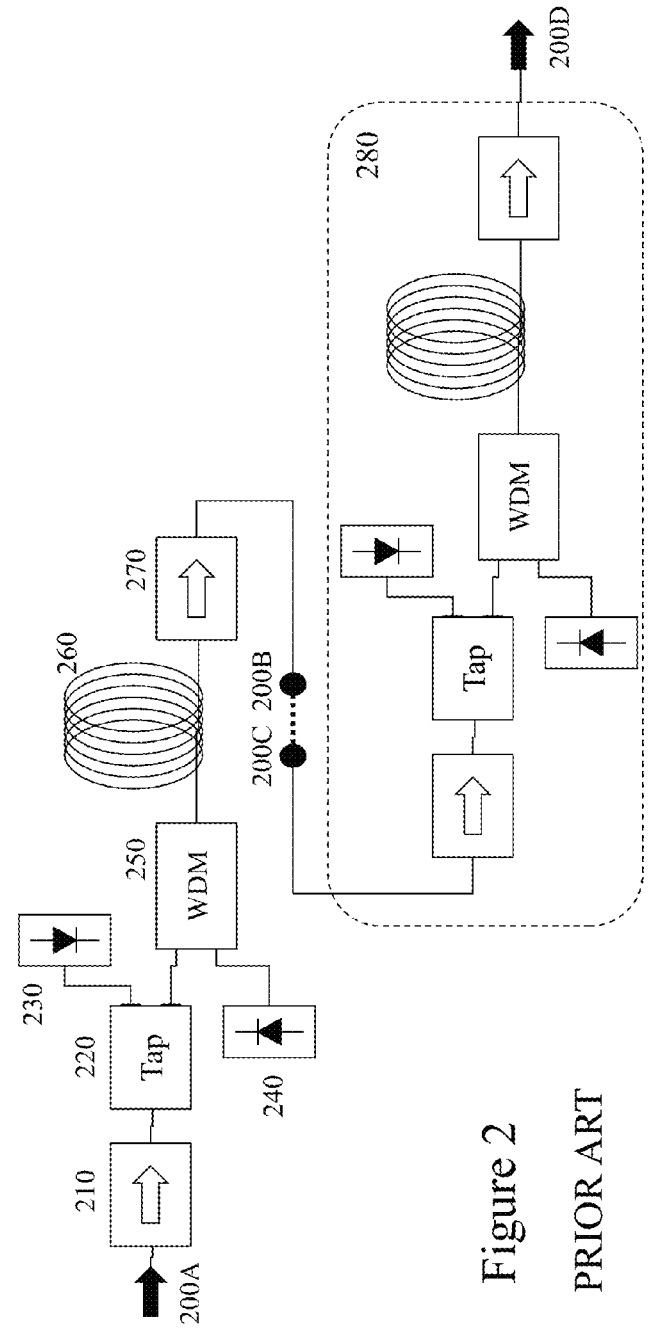
FIG. 2 depicts a dual stage DFA according to the prior art.

Now referring to FIG. 2 there is depicted a dual stage DFA according to the prior art. As depicted an input port 100A is coupled to a first DFA stage comprising input isolator 210, tap coupler 220, tap detector 230, pump LD 240, WDM 250, doped optical fiber 260, and stage isolator 270. Accordingly the optical signals received at the dual stage DFA are isolated from the preceding optical network by input isolator 210 wherein the combined optical signals are tapped by tap coupler 220, which may for example be a 1% power tap, wherein the tapped signal is coupled to the tap detector 230 wherein the output of the tap detector 230 is coupled to a control circuit, not shown for clarity. The optical signals are themselves coupled to WDM 250 wherein they are combined with the pump LD 240 and coupled to the doped optical fiber 260 wherein they are amplified in dependence upon the characteristics of the doped optical fiber 260, the pump LD 240, and the number of channels, their power distribution etc. The amplified optical signals are then isolated via stage isolator 270 before being coupled to first inter-stage port 200B. First inter-stage port 200B may be coupled directly to second inter-stage port 200C or via an interim optical element such as a gain-flattening filter (GFF), chromatic dispersion compensator, amplified spontaneous emission (ASE) filter, or dynamic channel equalizer (DCE) for example.

The second inter-stage port 200C is coupled to second-stage DFA 280 and therein output port 200D. As depicted second-stage DFA 280 is essentially a replica of the first-stage DFA comprising input isolator, tap coupler, tap detector, pump LD, WDM, doped optical fiber, and stage isolator in a configuration such as described supra. Accordingly, as is well documented within the prior art the first stage typically provides linear amplification of the optical signals whereas the second stage, second-stage DFA 280, provides power. The first stage can be viewed as a low-noise preamplifier whilst the second stage can be viewed as a power amplifier. Generally, the first stage DFA, and accordingly the pump LD 240, is dynamically adjusted to provide variable gain according to the input conditions whereas the second stage, second-stage DFA 280, and its pump LD are controlled for constant gain. Accordingly, the pump LDs within the two stages are operated independently of one another.

Within the descriptions below of optical amplifiers according to embodiments of the invention multiple elements have been omitted for clarity including, but not limited to, optical isolators, optical tap couplers, wavelength division multiplexers (WDMs), and monitor photodiodes. According to these embodiments some or all of these may be employed within an optical amplifier.

Referring to FIG. 3 there is depicted an optical amplifier according to an embodiment of the invention employing dual pump sources and in-band channel power management. As depicted optical signals received at an input port 300A, $\lambda_{signal}$, are coupled via to a first optical amplifier 320 which also receives a pump signal, $\lambda_C$, from first pump LD 310 and provides a gain β. The output of the first optical amplifier 320 is coupled to a tunable splitter 330 wherein a proportion, α, of the signal $\lambda_C$ is coupled to first output port 300B such that a combined optical signal $\beta\lambda_{signal}+(1-\alpha)\lambda_C$ is coupled to the second optical amplifier 340. The second optical amplifier 340 also receives a pump signal, $\lambda_{980}$, from a 980 nm pump LD coupled to second input port 300C wherein the output of the second optical amplifier 340 is coupled to second output port 300D via optical element 350. Accordingly, signal $\lambda_C$ acts a pump signal for the first optical amplifier 320 whilst mitigating transient variations in $\lambda_{signal}$ wherein after amplification $\alpha\lambda_C$ is coupled out from the output of the first optical amplifier 320 prior to coupling the combined optical signal to the second optical amplifier 340 wherein the remaining portion $(1-\alpha)\lambda_C$ is combined with the pump signal, $\lambda_{980}$, in order to pump the second optical amplifier 340. As such this all-optical scheme mitigates transient variations in $\lambda_{signal}$ without wasting pump laser power. Alternatively, in other embodiments of the invention the remaining portion $(1-\alpha)\lambda_C$ may be designed to be out of the band of the second optical amplifier for amplification but as a second optical signal to be amplified thereby competing with the $\lambda_{signal}$.

Such a situation for example arising wherein the first amplifier is a Raman amplifier and the residual optical signals at 14XX nm do not pump the second Erbium doped optical amplifier.

Now referring to FIG. 4A there is depicted a hybrid optoelectronic scheme for an optical amplifier according to an embodiment of the invention employing feed-forward optoelectronic and optoelectronic conversions. As depicted optical signals received at an input port 400A, $\lambda_{signal}$, are coupled via to a first optical amplifier 420 which also receives a pump signal, $\lambda_{A:980}$, from first pump LD 410 and provides a gain β to the optical signals received. The output of the first optical amplifier 420 is coupled to a WDM 430 wherein the remaining pump signal, $\delta\lambda_{A:980}$, is coupled to a detector 460 forming part of OEO controller 480. The amplified optical signals, $\beta\lambda_{signal}$, are coupled via optional delay 435 to a second optical amplifier 440, the output of which is coupled via optical element 450 to output port 400B. The optional delay 435 providing appropriate delay for the amplified optical signals to accommodate the signal conversion and/or signal processing within the OEO controller 480.

The converted residual pump signal, $\delta\lambda_{A:980}$, from the detector 460 in OEO controller 480 is coupled to signal source 470 operating at $\lambda_C$ wherein the output of this signal source 470 is coupled to the second optical amplifier 440 together with second pump signal, $\lambda_{B:980}$, from second pump LD 490. Accordingly, the first optical amplifier 420 provides a low noise linear amplifier but now the residual optical pump signal from the first optical amplifier 420 is converted through an OEO interface, OEO controller 480, to a feed-forward signal $\lambda_C$ which is used in conjunction with the second pump signal $\lambda_{B:980}$ to provide the optical pump required by the second optical amplifier 440. Accordingly, the design approach depicted in respect of FIG. 4 provides for reduced pump power requirements, and corresponding reduced pump power consumption, together with constant gain operation and transient suppression.

Optionally, OEO controller 480 includes dual emitters, one operating to provide a first feed-forward signal contributing to the pumping of the second optical amplifier 440 and the other to maintain the total input power to the second optical amplifier 440 constant wherein the second emitter emits therefore a signal out of band to the optical signals being amplified but within the gain bandwidth of the second optical amplifier 440. Alternatively the converted residual pump signal, $\delta\lambda_{A:980}$, the detector 460 in OEO controller 480 is coupled to the second pump LD 490 to generate the second pump signal, $\lambda_{B:980}$.

Now referring to FIG. 4B there is depicted a hybrid optoelectronic scheme for an optical amplifier according to an embodiment of the invention employing feed-forward optoelectronic and optoelectronic conversions. As depicted the overall structure comprises essentially the same optoelectronic elements and functions in the same manner as the hybrid optoelectronic scheme for an optical amplifier described supra and depicted in respect of FIG. 4A. However, the first pump LD 410 is now replaced with Erbium/Raman pump source 4100 wherein the source provides optical signals at 980 nm for pumping the erbium doped optical fiber and 1480 nm signals for Raman amplification within the optical fiber within dual mode amplifier 4200. Residual pump signals at 980 nm and 1480 nm are filtered from the amplified optical signals in edge filter 4300 wherein the filtered residual pump signals are then coupled to wavelength converter 4800 such that the residual pump signal at 980 nm and/or the residual pump signal at 1480 nm are converted to provide the signal $\lambda_C$ to the second optical amplifier 440 together with the amplified signals of interest, $\lambda_{SIGNAL}$, and second pump signal $\lambda_{B:980}$. It would be evident to one skilled in the art that the Erbium/Raman pump source 4100, first optical amplifier 4200, and wavelength converter 4800 may operate at one wavelength, i.e. 980 nm or 1480 nm, or both wavelengths. In the case that both 980 nm and 1480 nm wavelengths are active then the wavelength converter 4800 may convert both wavelengths to the same signal wavelength, $\lambda_C$, or it may two signal wavelengths, $\lambda_{C1}$ and $\lambda_{C2}$ as depicted in FIG. 4C.

It is also evident in FIG. 4C that the configuration of the initial optical amplifier, co-counter Raman amplifier 4200, exploits counter-propagating 14XX pumping which is depicted by first and second pump sources 4100A and 4100B respectively wherein first pump source 4100A provides 1465 nm and 1470 nm forward propagating pump signals together with a 980 nm pump signal whilst second pump source 4100B provides 1475 nm and 1480 nm counter propagating pump signals. The output of the co-counter Raman amplifier 4200 is coupled to filter 4300 that separates the residual 980 nm pump signal and residual 14XX nm forward propagating pump signals from the amplified optical signal, $\beta\lambda_{SIGNAL}$. As depicted the residual 980 nm pump signal is coupled to a first wavelength converter block 4800A therein generating first control signal $\lambda_{C1}$ whilst the residual 14XX nm forward propagating pump signals are coupled to a second wavelength converter block 4800B therein generating second control signal $\lambda_{C2}$. Each of the first control signal $\lambda_{C1}$ and second control signal $\lambda_{C2}$ are then coupled to the second optical amplifier 440 together with second 980 nm pump signal $\lambda_{B:980}$ thereby amplifying the amplified optical signal, $\beta\lambda_{SIGNAL}$ further. Optionally the residual counter propagating signals may also be coupled to a further wavelength converter or second wavelength converter 4800B.

Referring to FIG. 5 there is depicted an optical amplifier according to an embodiment of the invention employing feed-forward optoelectronic and optoelectronic conversions in conjunction with dynamic in-band channel power management. As depicted optical signals received at an input port 500A, $\lambda_{signal}$, are coupled via to a first optical amplifier 530 which also receives a pump signal, $\lambda_{A:980}$, from first pump LD 510 as well as a first control signal, $\lambda_{C1}$, from first control source 520 and provides a gain $\beta$ to the optical signals received. The output of the first optical amplifier 530 is coupled to a first optical element 540 wherein the remaining pump signal, $\delta\lambda_{A:980}$, is coupled to a first detector 560 forming part of OEO controller 595 as well as the first control signal, $\lambda_{C1}$, which is coupled to a second detector 570. The amplified optical signals, $\beta\lambda_{signal}$, are coupled via optional delay 545 to a second optical amplifier 550, the output of which is coupled via optical element 565 to output port 500B. The optional delay 545 providing appropriate delay for the amplified optical signals to accommodate the signal conversion and/or signal processing within the OEO controller 595.

The converted residual pump signal, $\delta\lambda_{A:980}$, and converted first control signal, $\lambda_{C1}$, from the first and second detectors 560 and 570 respectively in OEO controller 595 are coupled to control source 580 operating at $\lambda_{C2}$ wherein the output of this control source 580 is coupled to the second optical amplifier 550 together with second pump signal, $\lambda_{B:980}$, from second pump LD 590. Accordingly, the first optical amplifier 530 provides a low noise linear amplifier but now the residual optical pump signal $\lambda_{A:980}$ from the first optical amplifier 530 is converted through an OEO interface, OEO controller 595, to a feed-forward signal $\lambda_{C2}$ which is used in conjunction with the second pump signal $\lambda_{B:980}$ to control the operation of second optical amplifier 550. Feed-forward signal $\lambda_{C2}$ may for example be within the absorption band of the dopant to provide optical pumping in combination with the second pump signal $\lambda_{B:980}$ or it may be employed within the gain bandwidth of the second optical amplify 550 to control the overall optical power coupled to the second optical amplifier 550.

Now referring to FIG. 6A there are depicted a controller variant for optical amplifiers according to embodiments of the invention employing feed-forward optoelectronic and opto-electronic conversions in conjunction with dynamic in-band channel power management of a similar configuration as that described above in respect of FIG. 5. However, the configuration of the OEO controller 595 has been varied as depicted by first controller variant 695A wherein the first control signal, $\lambda_{C1}$, from first detector 660 is not only coupled to the control source 680 operating at $\lambda_{C2}$ but also to pump LD 690 which generates the second pump signal, $\lambda_{B:980}$. Second detector 670 is also coupled to both the control source 680 and pump LD 690. Accordingly, control for the control source 680 and pump LD 690 are derived from at least the first control signal but also electrical power for the control source 680 is derived from the residual optical pump.

Figures 6B, 6C:
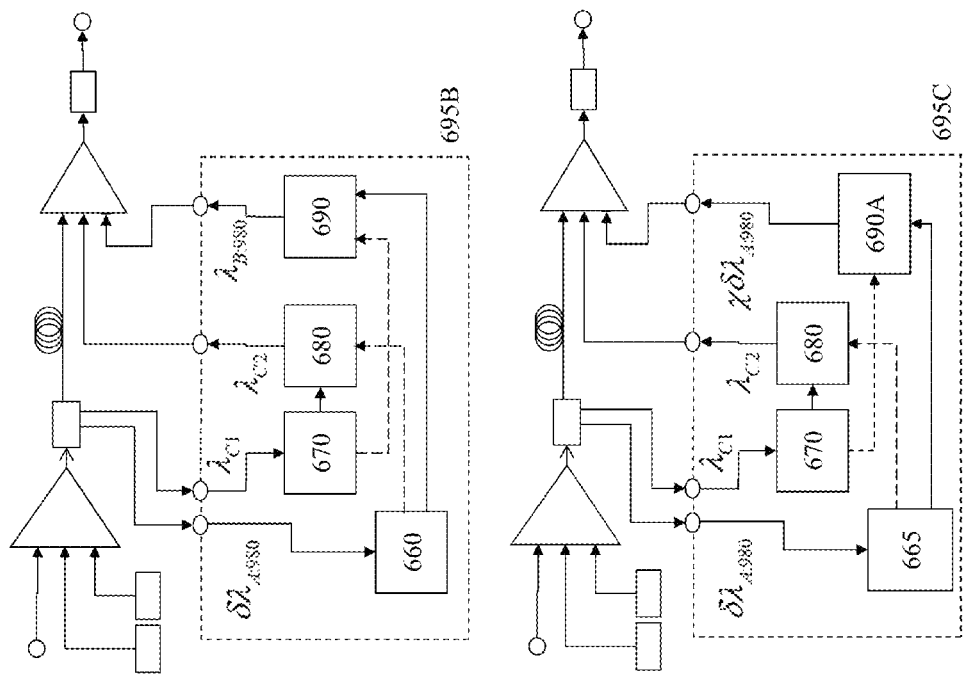

Now referring to second controller variant 695B in FIG. 6B the first control signal, $\lambda_{C1}$, is not only coupled to the control source 680 operating at $\lambda_{C2}$ but also to pump LD 690 which generates the second pump signal, $\lambda_{B:980}$. Similarly the residual optical pump signal $\lambda_{A:980}$ from the first optical amplifier is coupled to both the control source 680 and the pump LD 690. Accordingly, control for the control source 680 and pump LD 690 is now derived from both the first control signal $\lambda_{C1}$ and the residual optical pump signal $\delta\lambda_{A:980}$. However, now electrical power pump LD 690 is derived from the residual optical pump signal $\delta\lambda_{A:980}$ thereby reducing the power requirements of the optical amplifier.

Now referring to third controller variant the first control signal, $\lambda_{C1}$, received by the controller detector 670 is not only coupled to the control source 680 operating at $\lambda_{C2}$ but also to attenuator 695 which adjusts the power level of the residual first pump signal, $\delta\lambda_{A:980}$, to provide an output second pump signal $\chi\delta\lambda_{A:980}$. Similarly the residual optical pump signal $\delta\lambda_{A:980}$ from the first optical amplifier is coupled to the control source 680 via tap-detector 665 which taps a predetermined portion of the residual optical pump signal $\delta\lambda_{A:980}$ and provides the electrical signal to control source 680 whilst leaving the remainder of the residual optical pump signal $\delta\lambda_{A:980}$ in the optical domain and coupling it forward to the attenuator 695. Accordingly, control for the control source 680 and attenuator 695 are now derived from both the first control signal $\lambda_{C1}$ and the residual optical pump signal $\delta\lambda_{A:980}$. However, now rather than a second pump LD direct adjustment of the residual optical pump signal $\delta\lambda_{A:980}$ is provided thereby reducing the power requirements of the optical amplifier.

Within embodiments of the invention described above first and second control signals $\lambda_{C1}$ and $\lambda_{C2}$ respectively may be at different wavelengths or alternatively the same out of band wavelength. First and second control signals $\lambda_{C1}$ and $\lambda_{C2}$ may overlap with a network control signal propagated along the optical link within which the optical amplifier according to an embodiment of the invention is deployed wherein this network control signal is extracted, processed, and re-inserted without passing through the optical amplifier. Where the network control signal is coupled through the optical amplifier as well as the optical signals carried by the optical link then the first and second control signals $\lambda_{C1}$ and $\lambda_{C2}$ respectively may be selected according to the gain profile of the optical amplifier and the filter characteristics of the add/drop elements within the optical amplifier for these signals.

According to other embodiments of the invention first detector 660 and pump LD 690 which provide OEO conversion of the 980 nm pump signal may be replaced with a direct optical feed-forward path with a tap coupler, monitoring photodetector, and variable optical attenuator wherein the WDM blocks 980 nm pump signal directly between the stages. Optionally, a direct optical feed-forward path may replace the OEO conversion between the first control signal at $\lambda_{C1}$ and the second control signal at $\lambda_{C2}$ provided by second detector 670 and control source 680 which may or may not also provide wavelength conversion by virtue of the control source 680 emitting at a different wavelength to the first control source coupled to the first stage of the optical amplifier. It would be apparent to one skilled in the art that the direct optical feed-forward path may similarly comprise a tap coupler, monitoring photodetector, and variable optical attenuator as with the pump laser feed-forward path. It would also be apparent that all-optical wavelength conversion may be included, such as for example may be achieved with semiconductor optical amplifiers (SOAs), see for example Durhuus et al in "All-Optical Wavelength Conversion by Semiconductor Optical Amplifiers" (J. Lightwave Tech., Vol. 14, pp. 942-954).

Figure 7:
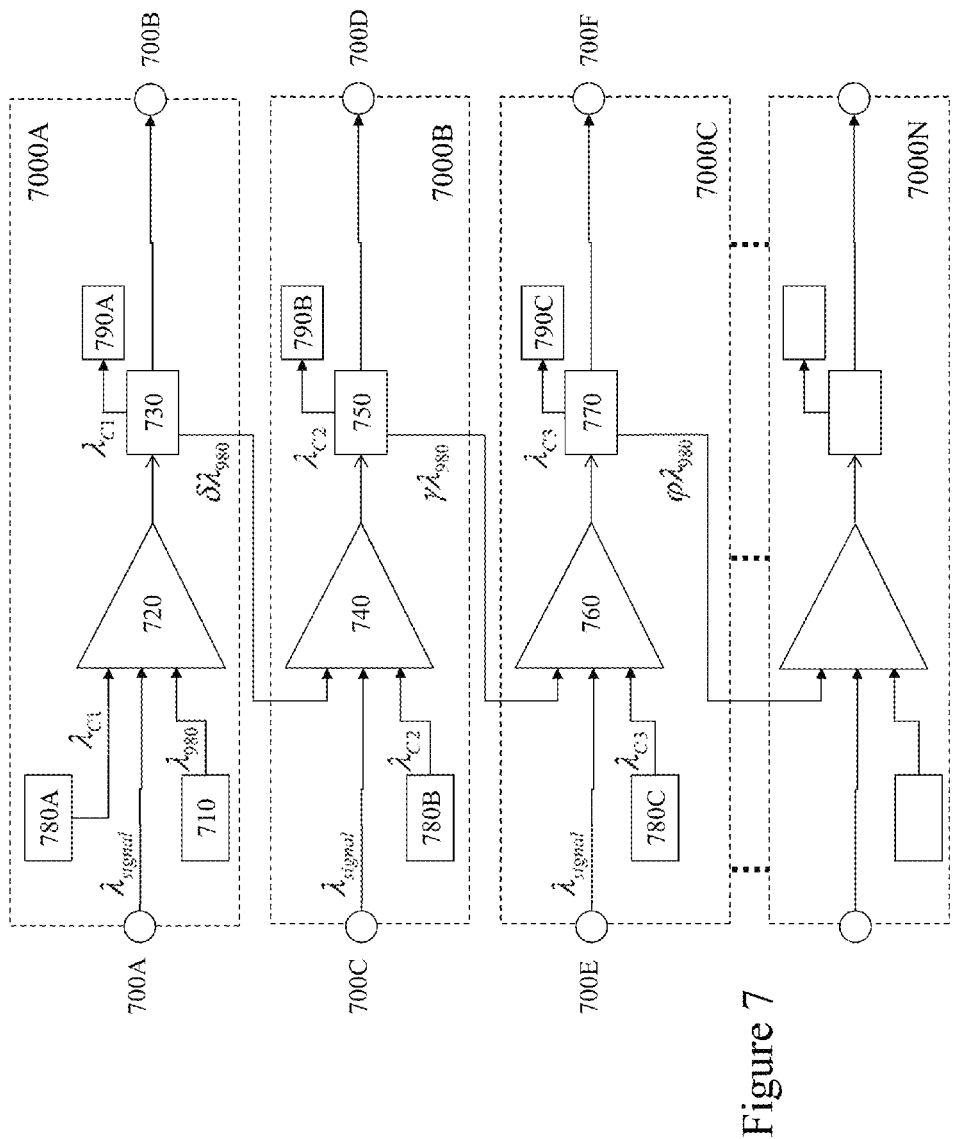
FIG. 7 depicts parallel optical amplifiers according to an embodiment of the invention exploiting optical pump re-use.

Referring to FIG. 7 there is depicted a parallel optical amplifier configuration according to an embodiment of the invention exploiting optical pump re-use comprising first to third optical amplifiers (OAs) 7000A to 7000C respectively of a chain of N amplifiers terminating with Nth optical amplifier 7000N. First OA 7000A is depicted as amplifying optical signals received at first input port 700A and coupling these to first output port 700B. As depicted a pump source 710 provides the required population inversion of the first doped fiber 720 via pump signal $\lambda_{980}$ in order to amplify the received signals received at first input port 700A. Also coupled to first doped fiber 720 is first control signal, $\lambda_{C1}$, from first control source 780A. At the output of the first doped fiber 720 a first WDM 730 separates the first control signal, $\lambda_{C1}$, and the first residual pump signal $\delta\lambda_{980}$ from the amplified optical signals which are then coupled to the first output port 700B. The first control signal, $\lambda_{C1}$, being coupled to first controller 790A.

Accordingly, the first residual pump signal $\delta\lambda_{980}$ is coupled to second doped fiber 740 within second OA 7000B together with second control signal $\lambda_{C2}$ from second control source 780B. Second WDM 750 now separates second control signal, $\lambda_{C2}$, and the second residual pump signal $\gamma\lambda_{980}$ from the amplified optical signals coupled to second doped fiber 740 from second input port 700C which are then coupled to the second output port 700D. This residual pump signal $\gamma\lambda_{980}$ is then coupled to third doped fiber 760 within third OA 7000C together with third control signal $\lambda_{C3}$ from third control source 780C. Third WDM 770 now separates the third control signal, $\lambda_{C3}$, and the third residual pump signal $\phi\lambda_{980}$ from the amplified optical signals coupled to third doped fiber 760 from third input port 700E which are then coupled to the third output port 700F. Accordingly this sequence repeats until the Nth OA 7000N and within each of the second and third OAs 7000B and 7000C respectively the second and third control signals, $\lambda_{C2}$ and $\lambda_{C3}$ respectively, are coupled to second and third controllers 790B and 790C respectively.

Using the design example supra wherein pump source 710 provides an output optical pump power of 600 mW then the residual pump powers are $\delta\lambda_{980}$=420 mW, $\gamma\lambda_{980}$=294 mW and $\phi\lambda_{980}$=206 mW for a constant PCE of 30% each of the first to third doped fibers 720, 740, and 760 respectively. Accordingly the absorbed powers in first to third OAs 700A through 700C respectively would be 180 mW, 126 mW, and 88 mW respectively. However, if the first to third doped fibers are provided with PCE's of 25%, 34%, and 50% then the power absorbed within the first to third OAs 7000A to 700C respectively would be 150 mW, 153 mW, and 148 mW respectively. In each instance losses between sequential amplifiers and as a result of the WDM elements etc have been ignored but it would be apparent to one skilled in the art how such amplifier chains may be designed. Optionally, after the third OA 7000C the residual pump power is $\phi\lambda_{980}$=148 mW for the PCE sequence of 25%, 34%, 50% with initial pump power 600 mW. Accordingly, it would be evident that this residual pump power may be coupled to an OEO converter such as described above in respect of FIGS. 4 through 6 respectively wherein the OEO converter in this instance may provide the third control signal $\lambda_{C3}$.

Figure 8:
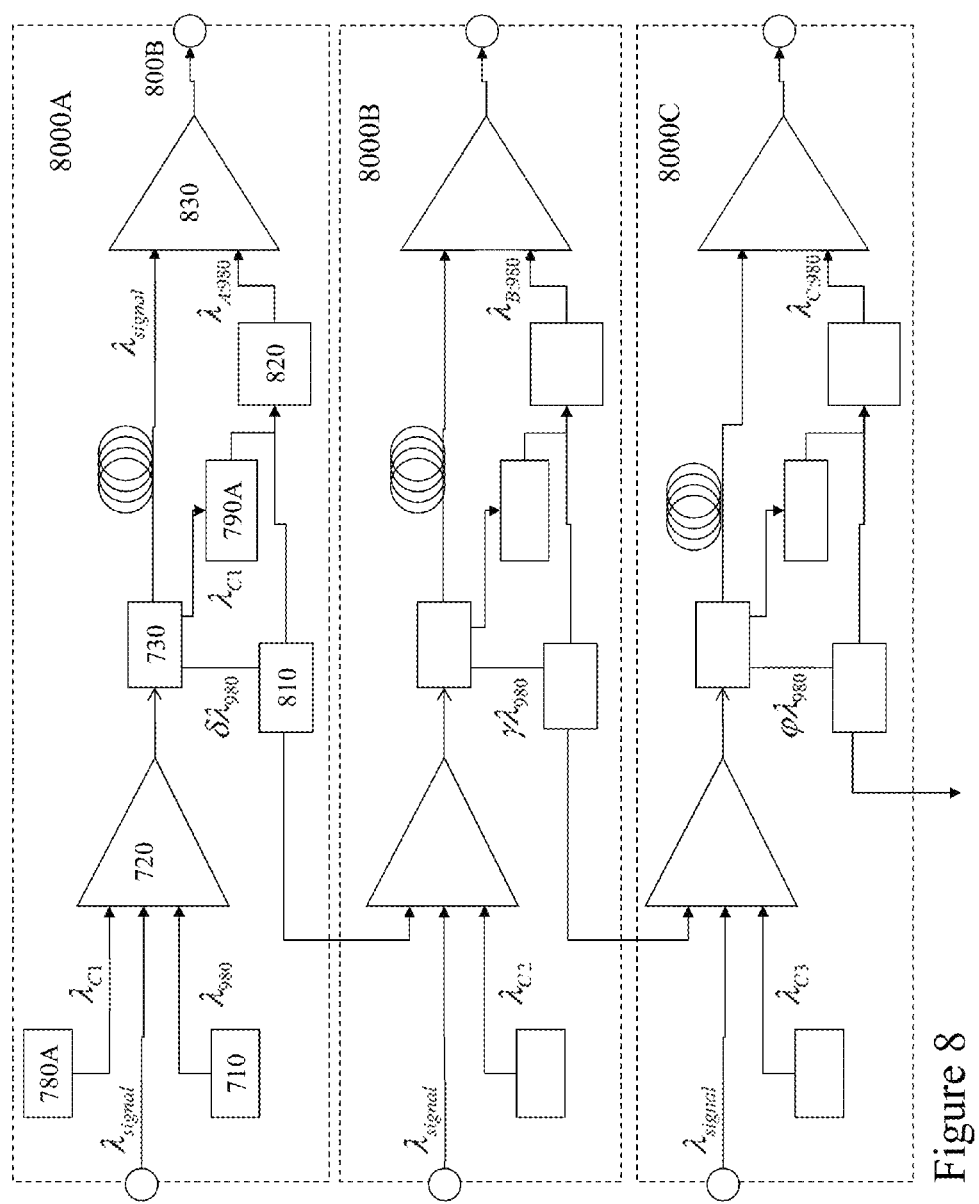
FIG. 8 depicts parallel optical amplifiers according to an embodiment of the invention exploiting optical pump re-use.

Referring to FIG. 8 there is depicted a parallel optical amplifier configuration according to an embodiment of the invention exploiting optical pump re-use. In essence the parallel optical amplifier configuration is similar to that in FIG. 7 described supra. However, in this instance each of the depicted first to third OAs 8000A to 8000C respectively comprises first and second doped fiber sections 720 and 830 respectively. First OA 8000A comprises first content source 780A, pump source 710, WDM 730, and such that the first doped fiber section 720 is actively pumped and fed with the first control signal, $\lambda_{C1}$, in addition to the optical signals to be amplified as with the first OA 7000A described above in respect of FIG. 7. However, now the output from WDM 730 is a first channel comprising the residual pump signal, $\gamma\lambda_{980}$, which couples via tap coupler 810 to the second OA 7000B thereby providing the pump signal for that and subsequent amplifiers, and a second channel comprising the first control signal, $\lambda_{C1}$, which is coupled to first controller 790A. The tapped residual pump signal, $\gamma\lambda_{980}$, is also coupled to first controller 790A such that the first control signal, $\lambda_{C1}$, and tapped residual pump signal, $\gamma\lambda_{980}$, are employed in establishing the pump power for the second doped fiber section 830.

It would be apparent to one skilled in the art that variations of the embodiment described above in respect of FIG. 8 may be employed including, but not limited to, those described above in respect of FIGS. 4 through 7. Optionally, a variable attenuator or fixed attenuator may be disposed between sequential amplifier stages to adjust the optical power level of the residual pump signal propagating from one optical amplifier to another.

Figure 9:
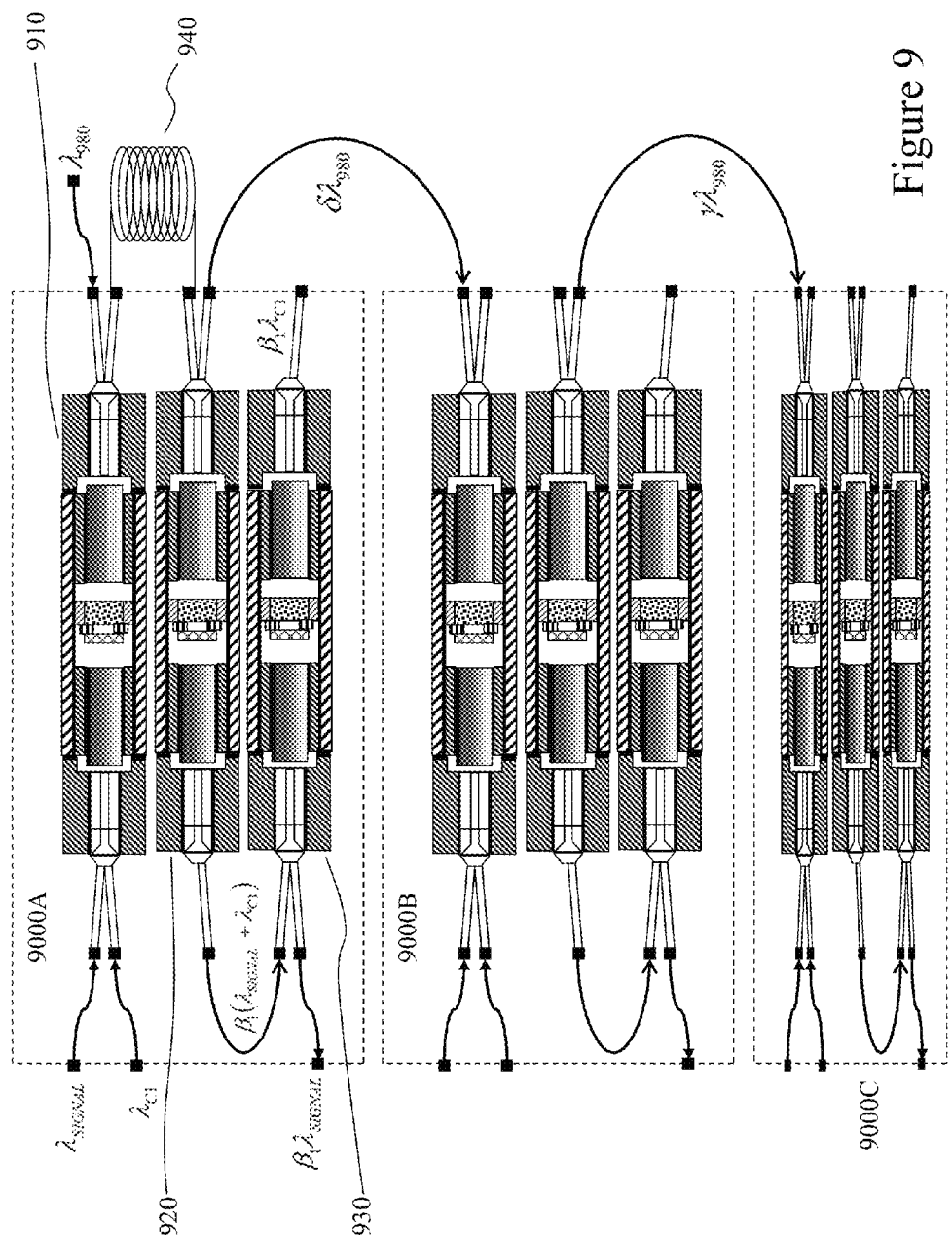
FIG. 9 depicts a micro-optic hybrid circuit providing compact low loss implementation of optical functional elements of a parallel optical amplifier configuration.

Now referring to FIG. 9 there is depicted first to third micro-optic hybrid circuits 9000A through 9000C providing compact low loss implementations of the optical functional elements of parallel optical amplifier configurations described above in respect of FIGS. 7 and 8. As depicted first micro-optic hybrid circuit 9000A comprises first to third micro-optic devices 910 through 930 respectively. First micro-optic device 910 comprises a combiner, isolator, and WDM such that the first control signal, $\lambda_{C1}$, is initially combined with the signals to be amplified, $\lambda_{SIGNAL}$, which are then coupled via an isolator to an output port of the first micro-optic device 910. Also coupled to a port on the output side of the first micro-optic device 910 is pump source, $\lambda_{980}$, which is reflectively combined with the first control signal, $\lambda_{C1}$, and signals to be amplified, $\lambda_{SIGNAL}$, which are then coupled via first doped fiber 940 and thence to second micro-optic device 920. Second micro-optic device 920 separates the residual pump signal, $\delta\lambda_{980}$, which is then coupled to the second micro-optic circuit 900B. The amplified optical signal and first control signal are coupled via an isolator to the output of the second micro-optic circuit 920 and thence to third micro-optic circuit 930 comprising a WDM that separates the amplified first control signal, $\beta\lambda_{C1}$, and amplified signal, $\beta\lambda_{SIGNAL}$.

Accordingly, each of second and third micro-optic circuits 9000B and 9000C comprises internally a similar configuration of first to third micro-optic devices 910 through 930 allowing in each case a control signal to be combined with signals to be amplified, these to be amplified and then separated wherein the optical link is also isolated on either side of the amplifying doped optical fiber. Each of the first to third micro-optic circuits 910 through 930 exploit graded refractive index lenses (GRIN lenses) to collimate/focus the optical signals through one or more optical elements including, but not limited to, transmissive thin-film filters, reflective thin-film filters, polarizers, Faraday rotators, attenuators, broadband partially reflective filters, etc in order to implement a variety of optical functions including, but not limited to, narrowband WDMs, broadband WDMs, band filters, single-stage optical isolators, multi-stage optical isolators, optical circulators, and optical taps allowing the required optical functionality of the first to third micro-optic devices 910 through 930 respectively to be implemented.

It would be evident to one skilled in the art that according to the optical designs implemented for the micro-optic devices that the required optical functions may be partitioned into one, two, three or more micro-optic devices which may be manufactured as multiple discrete elements that are then fusion spliced together for example. Examples of such micro-optic devices may for example be found within U.S. Pat. Nos. 6,347,170; 7,113,672; and 7,440,652 as well as U.S. Patent Applications 61/657,937; 61/657,943; 61/659,047; and U.S. Pat. No. 7,440,172 by the inventors which relate to low cost small diameter micro-optic devices. Existing commercial devices may for example be 35 mm long with diameter 5.5 mm although developments supported by the patent applications of the inventor would allow reduced diameters down to 2 mm, 1.5 mm, and potentially lower. Accordingly, very compact micro-optic circuits and hybrid circuits may be implemented with high performance including, but not limited to, low loss, high isolation, high rejection, low crosstalk, low polarization dependent loss (PDL), chromatic dispersion, and polarization mode dispersion (PMD).

Within the embodiments of the invention described above in respect of FIGS. 3 through 9 respectively emphasis has been placed upon $\lambda=980$ nm pump sources operating in conjunction with EDFA modules, gain blocks and/or amplifiers. However, it would be evident to one skilled in the art that alternatively the EDFA configurations may exploit $\lambda=1480$ nm. Optionally, within embodiments of the invention as described in respect of FIGS. 4 through 6 wherein opto-electronic conversion or all-optical conversion is employed one stage may exploit one wavelength whilst the second stage may exploit another wavelength. It would also be evident that even wherein the pump source wavelengths are nominally the same, such as $\lambda=980$ nm, that slightly different wavelengths may be employed such as for example $\lambda_{A:980}=973.5$ nm and $\lambda_{B:980}=975$ nm. In alternate embodiments of the invention multiple pump sources may be combined such as in the instance of so-called 14xx pump sources wherein 1420 nm$\leq\lambda_{A:1480}\leq$1456 nm, 1466 nm$\leq\lambda_{A:1480}\leq$1495 nm, and 1496 nm$\leq\lambda_{A:1480}\leq$1510 nm. In addition to EDFA amplifiers embodiments of the invention may exploit other dopants other than erbium including, but not limited to, Praseodymium (Pr3+), Europium (Eu3+), Neodymium (Nd3+), Terbium (Te3+), Lutetium (Lu3+), Ytterbium (Yb3+), Holmium (Ho3+), Dysprosium (Dy3+), Gadolinium (Gd3+), Samarium (Sm3+), Promethium (Pm3+), Cerium (Ce3+), Lanthanum (La3+) and Thulium (Tm3+) as well other amplification topologies such as Raman amplification for example.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. A method comprising:
    providing a first optical amplifier comprising:
        a first optical gain block for receiving optical signals to be amplified within a first predetermined wavelength range;
        an first optical pump signal coupled to the first optical gain block for establishing a population inversion within the first optical gain block to provide gain to optical signals within a second predetermined wavelength range; and
        a first optical control signal coupled to the first optical gain block, the first control signal being within a third predetermined wavelength range;
    providing a wavelength selective coupler disposed after the first optical gain block for separating the amplified optical signals from the first gain block from the residual optical pump signal;
    providing a second optical amplifier comprising:
        a second optical gain block for receiving the amplified optical signals from the first optical gain block;
        a second optical pump signal for establishing a population inversion within the second optical gain block to provide additional gain to optical signals within a third predetermined wavelength range; and
        a second optical control signal coupled to the second optical gain block, the second control signal being within a fourth predetermined wavelength range; and
    generating using residual first optical pump signal from the first optical amplifier at least one of the second optical control signal and second optical pump signal.

2. The method according to claim 1 wherein;
    generating using the residual optical pump signal the second optical control signal comprises converting the residual optical pump signal to the electrical domain and using the generated electrical signal to drive an optical emitter to provide the second optical control signal.

3. The method according to claim 1 wherein;
    generating using the residual optical pump signal the second optical pump signal comprises converting the residual optical pump signal to the electrical domain and using the generated electrical signal to drive an optical emitter to provide the second optical pump signal.

4. The method according to claim 1 wherein;
    generating using the residual optical pump signal the second optical pump signal comprises coupling the residual optical pump signal to the second optical amplifier thereby providing the second optical pump signal for the second optical amplifier.

5. The method according to claim 4 wherein;
    the residual optical pump signal is coupled via an attenuator to control the optical power level of the residual optical pump signal coupled to the second optical amplifier.

6. The method according to claim 1 wherein;
the first optical control signal is dynamically adjusted in response to the received optical signals to be amplified such that the total optical power of the first optical control signal and received optical signals is approximately constant.

7. The method according to claim 1 wherein;
the second optical control signal is dynamically adjusted in response to the amplified received optical signals to be amplified in the second optical amplifier such that the total optical power of the second optical control signal and amplified received optical signals is approximately constant.

8. A method comprising:
providing a first optical amplifier comprising:
- a first optical gain block for receiving optical signals to be amplified within a first predetermined wavelength range;
- an first optical pump signal coupled to the first optical gain block for establishing a population inversion within the first optical gain block to provide gain to optical signals within a second predetermined wavelength range; and providing a wavelength selective coupler disposed after the first optical gain block for separating the amplified optical signals from the first gain block from the residual optical pump signal;
providing a second optical amplifier comprising:
- a second optical gain block for receiving the amplified optical signals from the first optical gain block;
- a second optical pump signal for establishing a population inversion within the second optical gain block to provide additional gain to optical signals within a third predetermined wavelength range; and
generating using residual first optical pump signal from the first optical amplifier at least one of the second optical control signal and second optical pump signal.

9. The method according to claim 8 further comprising:
providing a first optical control signal coupled to the first optical gain block, the first control signal being within a third predetermined wavelength range and having an optical power such that the total optical power of the first optical control signal and received optical signals is approximately constant.

10. The method according to claim 8 further comprising:
providing a second optical control signal coupled to the second optical gain block, the second control signal being within a fourth predetermined wavelength range and having an optical power such that the total optical power of the second optical control signal and amplified received optical signals is approximately constant.

11. A method comprising:
providing a first optical amplifier comprising:
- a first optical gain block for receiving first optical signals from a first optical fiber to be amplified within a first predetermined wavelength range;
- an first optical pump signal within a second predetermined wavelength range coupled to the first optical gain block for establishing a population inversion within the first optical gain block to provide gain to the first optical signals; and providing a wavelength selective coupler for separating the amplified first optical signals from the first optical amplifier from residual optical pump signal not absorbed by the first optical gain block;
providing a second optical amplifier comprising:
- a second optical gain block for receiving the second optical signals from a second optical fiber to be amplified within a second predetermined wavelength range;
using residual first optical pump signal from the first optical amplifier to provide a second optical pump signal for establishing a population inversion within the second optical gain block to provide gain to the second optical signals within the third predetermined wavelength range.

12. The method according to claim 11 further comprising;
an optical attenuator to adjust the optical power level of the residual first optical pump signal coupled from the first optical amplifier to the second optical amplifier.

13. The method according to claim 11 further comprising:
providing a first optical control signal coupled to the first optical gain block, the first control signal being within a fourth predetermined wavelength range and having an optical power such that the total optical power of the first optical control signal and received first optical signals is approximately constant.

14. The method according to claim 11 further comprising:
providing a second optical control signal coupled to the second optical gain block, the second control signal being within a fifth predetermined wavelength range and having an optical power such that the total optical power of the second optical control signal and received second optical signals is approximately constant.

* * * * *